(12) United States Patent
Lee et al.

(10) Patent No.: US 9,096,381 B2
(45) Date of Patent: Aug. 4, 2015

(54) ENDLESS BELT HAVING MEANDERING PREVENTION GUIDE

(75) Inventors: Chun Im Lee, Suwon-si (KR); Sang Kyun Kim, Yongin-si (KR); Ki Nam Kwak, Yongin-si (KR); Sung Hoon Back, Yongin-si (KR); Sang Min Song, Seongnam-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 14/346,862

(22) PCT Filed: Sep. 5, 2012

(86) PCT No.: PCT/KR2012/007120
§ 371 (c)(1),
(2), (4) Date: Aug. 4, 2014

(87) PCT Pub. No.: WO2013/042886
PCT Pub. Date: Mar. 28, 2013

(65) Prior Publication Data
US 2014/0374222 A1  Dec. 25, 2014

(30) Foreign Application Priority Data
Sep. 23, 2011  (KR) .................. 10-2011-0096349

(51) Int. Cl.
*G03G 15/00* (2006.01)
*B65G 15/60* (2006.01)
*G03G 15/16* (2006.01)
*B29C 65/50* (2006.01)
*B29K 105/00* (2006.01)
*B29L 29/00* (2006.01)

(52) U.S. Cl.
CPC ............ *B65G 15/60* (2013.01); *B29C 65/5057* (2013.01); *G03G 15/1615* (2013.01); *G03G 15/6529* (2013.01); *G03G 15/755* (2013.01); *B29K 2105/0097* (2013.01); *B29L 2029/00* (2013.01); *G03G 2215/00143* (2013.01); *G03G 2215/00151* (2013.01)

(58) Field of Classification Search
USPC ........... 198/804, 806; 156/137; 399/121, 165, 399/303, 313
See application file for complete search history.

(56) References Cited

U.S. PATENT DOCUMENTS

| | | | | |
|---|---|---|---|---|
| 5,619,310 A * | 4/1997 | Todome | ...................... | 399/381 |
| 6,856,776 B2 * | 2/2005 | Matsuda et al. | ............. | 399/121 |
| 6,928,256 B2 * | 8/2005 | Matsuda et al. | ............. | 399/308 |
| 7,135,260 B2 * | 11/2006 | Miyakawa et al. | ......... | 430/45.3 |
| 7,583,914 B2 * | 9/2009 | Hatakeyama et al. | ........ | 399/168 |
| 7,801,473 B2 * | 9/2010 | Ando | ........................... | 399/323 |
| 7,819,240 B2 * | 10/2010 | Kim | .............................. | 198/809 |
| 7,957,685 B2 * | 6/2011 | Shimizu | ....................... | 399/308 |
| 8,099,032 B2 * | 1/2012 | Iwami et al. | .................. | 399/313 |
| 8,443,962 B2 * | 5/2013 | Kaneyama et al. | ........... | 198/496 |
| 8,450,033 B2 * | 5/2013 | Sugino et al. | .............. | 430/58.75 |
| 8,897,668 B2 * | 11/2014 | Kaneko et al. | ................ | 399/101 |
| 2002/0154204 A1 | 10/2002 | Tanimoto et al. | | |
| 2010/0221042 A1 * | 9/2010 | Fujita et al. | | |

FOREIGN PATENT DOCUMENTS

| | | | |
|---|---|---|---|
| JP | 2002-275440 A | 9/2002 | |
| JP | 2004-037490 A | 2/2004 | |
| JP | 2009-184833 A | 8/2009 | |
| JP | 2011-140212 A | 7/2011 | |

\* cited by examiner

*Primary Examiner* — Douglas Hess
(74) *Attorney, Agent, or Firm* — Sughrue Mion, PLLC

(57) ABSTRACT

Disclosed herein is an endless belt having a meandering prevention guide, wherein the meandering prevention guide is heat-treated, and thermoplastic double-sided adhesive tape exhibiting adhesivity using heat is applied to the meandering prevention guide.

5 Claims, 1 Drawing Sheet

Prior Art
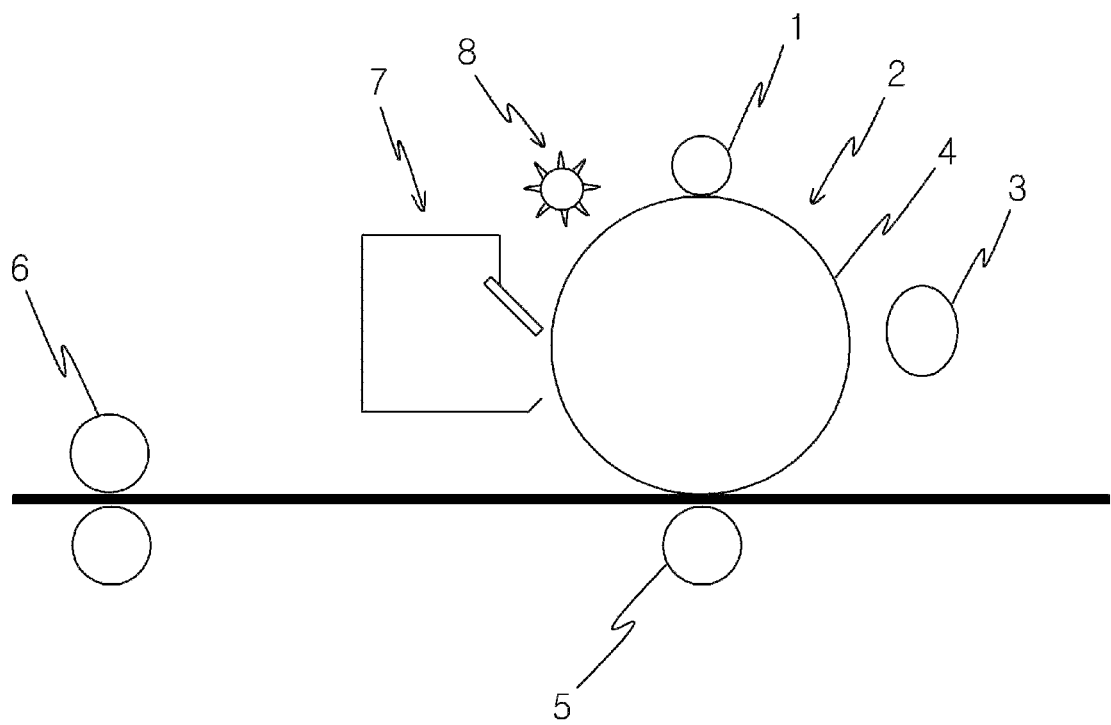

ENDLESS BELT HAVING MEANDERING PREVENTION GUIDE

CROSS REFERENCE TO RELATED APPLICATIONS

This application is a National Stage of International Application No. PCT/KR2012/007120, filed on Sep. 5, 2012 which claims priority from Korean Application No. 10-2011-0096349, filed Sep. 23, 2011, the contents of which are incorporated herein by reference in their entirety.

TECHNICAL FIELD

The present invention relates to an endless belt having a meandering prevention guide, which is usefully used in electrophotographic recording apparatuses, such as printers, copiers, videos, etc.

BACKGROUND ART

In a receiving apparatus such as a copier, a laser printer, a complex machine or the like, an endless belt has been used in a photosensitive devices, an intermediate transfer devices, a transfer carrying devices, a transferring separation devices or the like, which is mounted in an electrophotographic image forming apparatus. FIG. 1 shows an endless belt used in an image forming apparatus using an intermediate transfer belt. Referring to FIG. 1, when a carrier transport layer (CTL), which is located on the surface of an organic photoconductor drum (OPC drum, hereinafter referred to as a 'drum') 4, is charged with electricity ①, and the electrically charged drum 4 is exposed with a laser beam ②, electric charges move to the surface of the drum 4, so that the surface of the drum is made relatively positive (+), thereby forming a latent image. While a developing roller (magnetic roller) 3 rotates with the drum 4 at a minute distance, relatively negative (−) toner particles adhere to the surface of the drum exposed with the laser beam to form a letter or picture. The negative (−) toner particles adhering to the surface of the drum are transferred to the back of paper in a state of positive (+) electric charge by a transfer roller 5, thus forming an actual image. The toner formed on the paper is thermally pressed by a fuser roller 6 to be completely fusion-bonded on the paper, and then outputted. Then, the OPC drum 4 is physically or electrically cleaned using a cleaning blade 7 to form a new image on the drum 4. Further, electric charges remaining on the surface of the drum 4 are neutralized by a predetermined amount of light by erasing ⑧ to put the drum 4 back in an initial state, and then the drum is charged with electricity again.

In order to precisely rotate and drive an intermediate transfer belt, the intermediate transfer belt is required to have high linearity because a plurality of rollers coming into contact with the intermediate transfer belt must be parallel with a shaft. Further, the intermediate transfer belt is required to have uniform thickness and length. When the requirements are not satisfied, the intermediate transfer belt becomes meanderingly warped, so that exposure position or transfer position is missed, with the result that an image is blotted or distorted, and thus the intermediate transfer belt meanders to be damaged.

In order to prevent the meandering of an endless belt, there has been reported an endless belt which is provided at both ends thereof with a meandering prevention guide made of an elastic body such as rubber or urethane. This endless belt provided with the meandering prevention guide is usefully used in various electrophotographic image forming apparatuses because it performs its functions in a very stable manner and is cheap.

As examples of conventional technologies related to such a meandering prevention method, Japanese Unexamined Patent Application Publication No. 07-187435 discloses a method of providing a meandering prevention guide to an endless belt using an acrylic additive. However, when the acrylic additive is used, the acrylic additive can be detached from the meandering prevention guide, the meandering prevention guide must be supported until the acrylic additive is cured, and it is difficult to have highly-precise linearity. Further, when the endless belt is continuously driven while the meandering prevention guide is attached to the endless belt using the acrylic additive, the meandering prevention guide may be detached from the endless belt when the endless belt is driven along the curve of a roller for a long period of time.

Further, Japanese Unexamined Patent Application Publication No. 2000-310291 discloses a method of providing a meandering prevention guide to an endless belt using an acrylic or silicon-based additive containing a crosslinking agent or an initiator, wherein the meandering prevention guide is provided to the endless belt by irradiating the additive with ultraviolet or drying the additive at high temperature. However, this method is complicated. Further, this method is problematic in that the meandering prevention guide, which is an elastic body, is thermally deformed during the high-temperature drying, and thus its shape cannot be maintained constant.

As an alternative to the above methods, there is a method of attaching a meandering prevention guide to an endless belt using double-sided adhesive tape made of an acrylic additive. However, this method is also problematic in that, although the initial adhesivity of the double-sided adhesive tape is good, the adhesive strength between the belt body and the meandering prevention guide is insufficient, and the durability of the belt is low.

Meanwhile, Japanese Unexamined Patent Application Publication No. 2000-122439 discloses a method of attaching a meandering prevention guide to a belt using a one-component modified epoxy resin (liquid additive) that is cured at room temperature. However, there is a problem in that the liquid additive protrudes, and the initial adhesivity thereof becomes low.

In order to solve the above problem, Japanese Unexamined Patent Application Publication No. 2001-206522 discloses a method of attaching a meandering prevention guide to a belt using an adhesive layer formed of an adhesive composition including an acrylic copolymer and a crosslinking agent. This method was proposed to solve the problem that an endless belt and a meandering prevention guide are weak to shear loading. However, this method is also problematic in that the peel strength of the adhesive layer between the endless belt and the meandering prevention guide at an angle of 180° is at most 7N/20 mm, and thus the adhesive layer cannot have sufficient adhesivity.

DISCLOSURE

Technical Problem

Accordingly, the present invention has been made to solve the above-mentioned problems, and an object of the present invention is to provide a meandering prevention guide or adhesive tape for the meandering prevention guide, which has sufficient adhesivity and easy workability to prevent an endless belt from meandering even when the endless belt is used for a long period of time, an endless belt using the meandering prevention guide, and a method of manufacturing the endless belt.

Another object of the present invention is to provide an endless belt having high durability and a method of manufacturing the same.

Still another object of the present invention is to provide an endless belt suitable for an image forming apparatus and a method of manufacturing the same.

Technical Solution

In order to accomplish the above objects, an aspect of the present invention provides an endless belt having a meandering prevention guide, including: a synthetic resin belt body; double-sided adhesive tape; and a meandering prevention guide, wherein the double-sided adhesive tape includes an adhesive layer having a melting point of 120~180° C.

In the endless belt, the meandering prevention guide may be heat-treated at 120~230° C. for 30 seconds~1 hour in order to impart the required thermal stability to the meandering prevention guide.

Further, the meandering prevention guide may be made of polyester urethane.

Further, the peel strength between the synthetic resin belt body and the meandering prevention guide may be 10N/10 mm or more.

Further, the meandering prevention guide may be located on an inner circumference of the synthetic resin belt body.

Another aspect of the present invention provides a method of manufacturing an endless belt having a meandering prevention guide, comprising the steps of: heat-treating a meandering prevention guide at 100~300° C. for 30 seconds or more; pressing a thermoplastic double-sided adhesive tape including an adhesive layer having a melting point of 120~180° C. onto the heat-treated meandering prevention guide at a temperature of 120~180° C. to temporarily attach the thermoplastic double-sided adhesive tape to the meandering prevention guide; and pressing the meandering prevention guide, to which the thermoplastic double-sided adhesive tape was temporarily attached, onto a synthetic resin belt body to attach the meandering prevention guide to the synthetic resin belt body.

Advantageous Effects

According to the present invention, since a thermoplastic or thermosetting double-side adhesive tape is used instead of a conventional liquid adhesive, it is possible to prevent the conventional liquid adhesive from being dropped or being detached from a meandering prevention guide, thus improving workability. Further, when a thermally fusion-bonded adhesive tape is used, it is possible to prevent the meandering prevention guide from being wrinkled or waved by the thermal expansion or contraction of the elastic body such as polyurethane constituting the meandering prevention guide. Further, according to the present invention, an endless belt having a meandering prevention guide having high peel strength and high durability can be provided, and this endless belt can be applied to an image forming apparatus requiring a longer lifecycle.

DESCRIPTION OF DRAWING

The above and other objects, features and other advantages of the present invention will be more clearly understood from the following detailed description taken in conjunction with the accompanying drawing, in which:

FIG. 1 is a schematic view showing an endless belt.

REFERENCE NUMERALS

① —charging
② —exposure
③ —developing roller
④ —OPC drum
⑤ —transfer roller
⑥ —fuser roller
⑦ —cleaning blade,
⑧ —erasing

BEST MODE

The endless belt of the present invention includes: a synthetic resin belt body; double-sided adhesive tape; and a meandering prevention guide.

The synthetic resin belt body used in the endless of the present invention may be used in an endless belt used in a photosensitive devices, an intermediate transfer devices, a transfer carrying devices, a transferring separation devices, an charging devices, a developing devices or the like in an electrophotographic copier, a laser printer or the like. The raw material, shape, size and the like of the synthetic resin belt body are appropriately set according to the use and function of the above devices. For example, in the case of an intermediate transfer belt or a transfer carrying belt in an electrophotographic recording apparatus, a semiconductive belt made of a polyimide resin containing a conductive filler is used. In addition, a resin-made endless belt may be made of a polyimide resin, a polyester resin, a polyurethane resin, a polyamide resin, a fluorine resin or the like. Particularly, it is more preferred in terms of durability that the resin-made endless belt be made of a polyimide resin or a polyamide resin which does not easily degrade or deteriorate. The conductive filler used in an endless belt may be suitably selected according to the purpose thereof. As the conductive filler, carbon black having high conductivity such as Ketjen black, acetylene black or the like, graphite, carbon nanotubes, or a conductive polymer such as polyaniline, polypyrrole or the like may be suitably used. Further, if necessary, a dispersant, an additive or the like may be added to the resin-made endless belt. Further, it is preferred that the resin-made endless belt be a seamless belt. The thickness of the synthetic resin belt body is not particularly limited, but may be 0.02~0.20 mm.

The meandering prevention guide may be made of an elastic body having suitable hardness, such as polyurethane, neoprene rubber, urethane rubber, polyester elastomer, chloroprene rubber, nitrile rubber, silicon rubber or the like. In the present invention, in order to provide thermal stability to the meandering prevention guide, the meandering prevention guide is heat-treated at 100~300° C. for 30 seconds or more, preferably, at 120~230° C. for 30 seconds~1 hour. Therefore, considering electrical insulation, heat resistance and wear resistance, it is preferred that the meandering prevention guide be made of polyester urethane.

The thickness of the meandering prevention guide may be 0.05~3.00 mm, preferably, 1.00~2.00 mm in terms of a meandering prevention effect, durability or the like. The width of the meandering prevention guide may be 1~10 mm, preferably, 4~7 mm. Further, the length of the meandering prevention guide is suitably determined according to the shape and size of the endless belt and the place where the endless belt is attached.

Although the meandering prevention guide may be attached to any position of the synthetic resin belt body as long as a meandering prevention effect can be achieved, considering the meandering prevention effect, durability, a reinforcing effect or the like, the meandering prevention guide may be attached to one end or both ends of the inner circumference or outer circumference of the synthetic resin belt body, and may be attached to one end or both ends of the inner circumference of the synthetic resin belt body when the outer circumference thereof is used inside the device.

In the present invention, the meandering prevention guide is attached to the synthetic resin belt body by a thermoplastic double-sided adhesive tape including an adhesive layer having a melting point of 120~180° C. The thermoplastic double-sided adhesive tape is provided on both sides thereof with adhesive layers. Here, the adhesive layer is a solid layer which scarcely has adhesivity at room temperature, but exhibits adhesivity when it is melted by heating and then solidified by cooling. The adhesive layer of the thermoplastic double-sided adhesive tape, unlike a conventional pressure-sensitive adhesive that exhibits adhesivity by reducing pressure at room temperature, is melted at a predetermined temperature or more, and thus can be interposed between the synthetic resin belt body and the meandering prevention guide, thereby improving adhesivity.

Examples of the adhesive applied to the thermoplastic double-sided adhesive tape may include an acrylic resin, a polyester resin, a silicon-based resin, natural or synthetic rubber, a urethane resin, a vinyl chloride-vinyl acetate copolymer, a phenolic resin, an epoxy resin, and the like. When the meandering prevention guide is made of polyurethane, a polyester resin or a vinyl chloride-vinyl acetate copolymer may be preferably used as the adhesive in terms of increasing adhesivity and preventing dislocation. Further, as the base material of the thermoplastic double-sided adhesive tape, an inorganic material having no support, a PET film, a PP film, nonwoven fabric, a tissue or the like may be used, but the base material thereof is not particularly limited thereto. The thickness of the adhesive layer may be 5~500 μm, preferably, 20~200 μm. When the thickness of the adhesive layer is less than 5 μm, the adhesivity between the meandering prevention guide and the synthetic resin belt body is not sufficient. Further, when the thickness thereof is more than 500 μm, the meandering prevention guide can be mismatched with the adhesive layer by the shear force attributable to the meandering of an endless belt, and it is difficult to control linearity.

Hereinafter, the method of attaching the meandering prevention guide to the synthetic resin belt body using the thermoplastic double-sided adhesive tape will be described in detail. First, as described above, in order to assure the thermal stability of the meandering prevention guide, the meandering prevention guide is heat-treated at 100~300° C. for 30 seconds or more, preferably, at 120~230° C. for 30 seconds~1 hour. If the meandering prevention guide is attached to the synthetic resin belt body using the thermoplastic double-sided adhesive tape without heat-treating the meandering prevention guide, the endless belt having such a meandering prevention guide may stray from its normal operating because of the expansion and contraction of the meandering prevention guide occurring when the endless belt is driven for a long period of time. That is, it may be difficult to guarantee the durability of the endless belt.

Subsequently, the thermoplastic double-sided adhesive tape is pressed to the heat-treated meandering prevention guide at a temperature of 120~180° C. and a pressure of 2~5 bars for 2~5 seconds to temporarily attach the thermoplastic double-sided adhesive tape to the meandering prevention guide.

Subsequently, the meandering prevention guide, to which the thermoplastic double-sided adhesive tape was temporarily attached, is pressed to the synthetic resin belt body at a temperature of 120~180° C. and a pressure of 2~5 bars for 5~15 seconds to attach the meandering prevention guide to the synthetic resin belt body, thereby obtaining an endless belt having a meandering prevention guide.

In the endless belt having a meandering prevention guide obtained in this way, the peel strength between the synthetic resin belt body and the meandering prevention guide is 10~100N/20 mm, preferably, 20~100N/20 mm.

MODE FOR INVENTION

Hereinafter, the present invention will be described in more detail with reference to the following Examples. The raw materials used in the Examples and Comparative Examples are as follows.

(1) Endless belt: polyimide-made endless belt
(2) Meandering prevention guide member: polyester polyurethane (TR100-50, manufactured by Tigers Polymer Corporation)
(3) Adhesive
① Acrylic room-temperature pressure-sensitive double-sided adhesive tape (No. 500, manufactured by Nitto Denko Corporation)
② Polyester-based thermoplastic double-sided adhesive tape (ZT891-1, manufactured by Hitachi Kasei Polymer Corporation)

The physical properties of the endless belts of the Examples and Comparative Examples were evaluated as follows.

(1) Durability Test

An endless belt (outer diameter: 300 mm, width: 300 mm) provided at both ends thereof with meandering prevention guides each having a width of 5 mm was continuously driven for 100 hours under the conditions of a roll diameter of 30 mm, a roll speed of 100 mm/min and a belt tension of 0.16 N/mm, and then the mismatch of the meandering prevention guide with the endless belt and the damage of the endless belt were evaluated. When the meandering prevention guide and the endless belt did not change, this is represented by ○, and, when the meandering prevention guide was taken off or the endless belt was damaged, this is represented by X.

(2) Peel Strength Test

The endless belt, to which the meandering prevention guide was attached by the thermoplastic double-sided adhesive tape, was cut to a size of 20 mm×10 cm. The peel strength of the endless belt was measured under the conditions of a peel rate of 300 mm/min and a peel angle of 180° using a universal testing machine manufactured by Instron Corporation.

Example 1

A polyurethane guide member (TR100-50, manufactured by Tigers Polymer Corporation) was cut to a thickness of 1.20 mm and a width of 5 mm, heat-treated in an oven at 180° C. for 10 minutes, and then the surface of the polyurethane guide member was cleaned with a ketone solvent.

Subsequently, polyester-based thermoplastic double-sided adhesive tape having a thickness of 0.1 mm (ZT891-1, manufactured by Hitachi Kasei Polymer Corporation) was pressed against the heat-treated polyurethane guide member at a temperature of 100° C. and a pressure of 2 bars for 2 seconds to temporarily attach the polyester-based thermoplastic double-sided adhesive tape to the polyurethane guide member.

Subsequently, the polyurethane guide member, to which the polyester-based thermoplastic double-sided adhesive tape was attached, was pressed against a polyimide-made endless belt body at a temperature of 150° C. and a pressure of 5 bars for 5 seconds to obtain an endless belt having a meandering prevention guide.

Example 2

A polyurethane guide member (TR100-50, manufactured by Tigers Polymer Corporation) was cut to a thickness of 1.20 mm and a width of 5 mm, heat-treated in an oven at 200° C. for 5 minutes, and then the surface of the polyurethane guide member was cleaned with a ketone solvent.

Subsequently, a polyester-based thermoplastic double-sided adhesive tape having a thickness of 0.1 mm (ZT891-1, manufactured by Hitachi Kasei Polymer Corporation) was pressed against the heat-treated polyurethane guide member at a temperature of 100° C. and a pressure of 2 bars for 2 seconds to temporarily attach the polyester-based thermoplastic double-sided adhesive tape to the polyurethane guide member.

Subsequently, the polyurethane guide member, to which the polyester-based thermoplastic double-sided adhesive tape was attached, was pressed against a polyimide-made endless belt body at a temperature of 150° C. and a pressure of 5 bars for 5 seconds to obtain an endless belt having a meandering prevention guide.

Example 3

Polyester-based thermoplastic double-sided adhesive tape having a thickness of 0.1 mm (ZT891-1, manufactured by Hitachi Kasei Polymer Corporation) was pressed against a polyurethane guide member (TR100-50, manufactured by Tigers Polymer Corporation) cut to a thickness of 1.20 mm and a width of 5 mm at a temperature of 100° C. and a pressure of 2 bars for 2 seconds to temporarily attach the polyester-based thermoplastic double-sided adhesive tape to the polyurethane guide member. Subsequently, the polyurethane guide member, to which the polyester-based thermoplastic double-sided adhesive tape was attached, was pressed against a polyimide-made endless belt body at a temperature of 150° C. and a pressure of 5 bars for 5 seconds to obtain an endless belt having a meandering prevention guide.

Comparative Example 1

Acrylic room-temperature pressure-sensitive double-sided adhesive tape having a thickness of 0.2 mm (No. 500, manufactured by Nitto Denko Corporation) was attached to a polyurethane guide member (TR100-50, manufactured by Tigers Polymer Corporation) cut to a thickness of 1.20 mm and a width of 5 mm under reduced pressure. Subsequently, the polyurethane guide member was attached to a polyimide-made endless belt body to obtain an endless belt having a meandering prevention guide.

Comparative Example 2

A polyurethane guide member (TR100-50, manufactured by Tigers Polymer Corporation) was cut to a thickness of 1.20 mm and a width of 5 mm, heat-treated in an oven at 180° C. for 10 minutes, and then the surface of the polyurethane guide member was cleaned with a ketone solvent. Subsequently, acrylic room-temperature pressure-sensitive double-sided adhesive tape having a thickness of 0.2 mm (No. 500, manufactured by Nitto Denko Corporation) was attached to the polyurethane guide member under reduced pressure, and then the polyurethane guide member was attached to a polyimide-made endless belt body to obtain an endless belt having a meandering prevention guide.

The test results of the endless belts obtained from the Examples and Comparative Examples are given in Table 1 below.

TABLE 1

|  | Peel strength (N/20 mm) | Durability |
|---|---|---|
| Example 1 | 30.2 | ○ |
| Example 2 | 29.5 | ○ |
| Example 3 | 29.0 | Δ |
| Comparative Example 1 | 17.5 | Δ |
| Comparative Example 2 | 18.0 | Δ |

As the results of the peel strength test of the endless belts having a meandering prevention guide of Examples 1 and 2, it can be ascertained that the endless belts exhibited excellent adhesivity and that the meandering prevention guide was not taken off and the endless belts were not damaged when conducting a continuous durability test for 100 hours. Meanwhile, in the case of Example 3, it can be ascertained that, although the peel strength of the endless belt was good, the meandering prevention guide became detached from a film and the film was damaged when conducting a continuous durability test for 100 hours because the urethane expanded and contracted in the process of heating the thermoplastic double-sided adhesive tape to attach it to the meandering prevention guide. From the result of Example 3, it can be ascertained that, in order to satisfy durability as well as adhesivity, it is most preferred that a meandering prevention guide be heat-treated and then attached to a belt body using thermoplastic double-sided adhesive tape.

In the case of Comparative Examples 1 and 2, it can be seen that a meandering prevention guide was partially stripped because of insufficient adhesivity when conducting a continuous durability test for 100 hours. From this result, it can be ascertained that, when adhesivity is insufficient, the meandering prevention guide can be stripped at the time of driving the endless belt for a long time, and thus the endless belt can be damaged.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An endless belt having a meandering prevention guide, comprising:
   a synthetic resin belt body;
   a double-sided adhesive tape; and
   a meandering prevention guide,
   wherein the double-sided adhesive tape includes an adhesive layer having a melting point of 120-180° C., and
   wherein the meandering prevention guide is heat-treated at 120-230° C. for 30 seconds-1 hour.
2. The endless belt of claim 1, wherein the meandering prevention guide is made of polyester urethane.

3. The endless belt of claim 1, wherein the peel strength between the synthetic resin belt body and the meandering prevention guide is 10N/10 mm or more.

4. The endless belt of claim 1, wherein the meandering prevention guide is located on an inner circumference of the synthetic resin belt body.

5. A method of manufacturing an endless belt having a meandering prevention guide, comprising the steps of:
- heat-treating a meandering prevention guide at 100-300° C. for 30 seconds or more;
- pressing a thermoplastic double-sided adhesive tape including an adhesive layer having a melting point of 120-180° C. onto the heat-treated meandering prevention guide at a temperature of 120-180° C. to temporarily attach the thermoplastic double-sided adhesive tape to the meandering prevention guide; and
- pressing the meandering prevention guide, to which the thermoplastic double-sided adhesive tape was temporarily attached, onto a synthetic resin belt body to attach the meandering prevention guide to the synthetic resin belt body.

\* \* \* \* \*